March 2, 1965

KIYOSHI INOUE 3,171,813

PRODUCTION OF SEMICONDUCTOR ELEMENTS

Filed Feb. 21, 1961

KIYOSHI INOUE

BY Karl F. Ross

AGENT

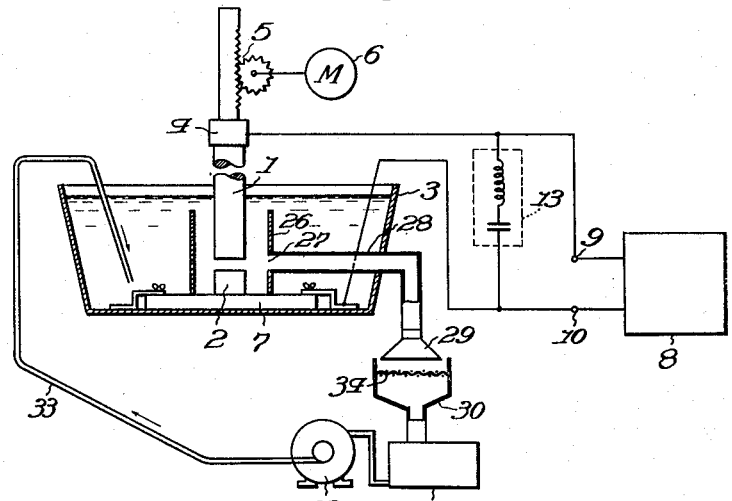

March 2, 1965  KIYOSHI INOUE  3,171,813
PRODUCTION OF SEMICONDUCTOR ELEMENTS
Filed Feb. 21, 1961  3 Sheets-Sheet 3
Fig. 8
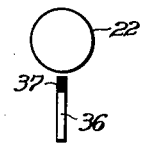
Fig. 10
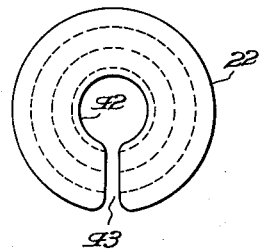
Fig. 9
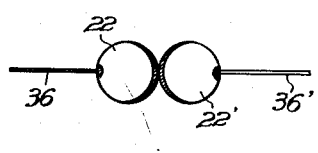
Fig. 11.(a)  Fig. 12.(a)  Fig. 13.(a)
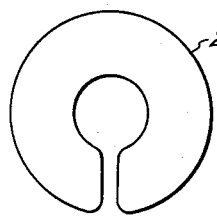 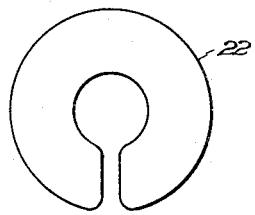 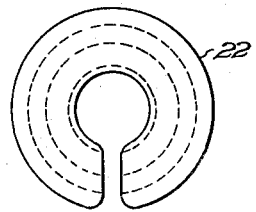
Fig. 11.(b)  Fig. 12.(b)  Fig. 13.(b)
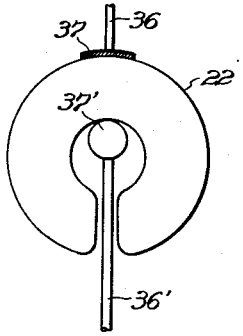 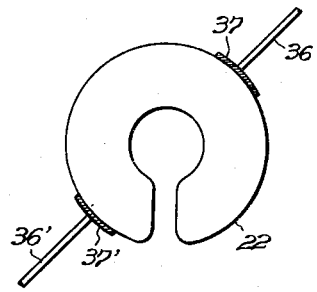 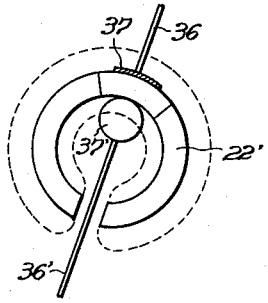
KIYOSHI INOUE
BY
AGENT United States Patent Office 3,171,813
Patented Mar. 2, 1965

3,171,813
PRODUCTION OF SEMICONDUCTOR ELEMENTS
Kiyoshi Inoue, 182 3–chome, Tamagawayoga-machi,
Setagaya-ku, Tokyo-to, Japan
Filed Feb. 21, 1961, Ser. No. 90,745
Claims priority, application Japan, Feb. 22, 1960,
35/5,663; Mar. 3, 1960, 35/6,574; Mar. 12, 1960,
35/8,168, 35/8,172; July 9, 1960, 35/31,315
3 Claims. (Cl. 252—62.3)

My invention relates to techniques of producing semiconductor elements, and more particularly it relates to a new method of producing semiconductor elements wherein monocrystalline semiconductor particles are obtained by the utilization of electric spark discharge and these monocrystalline semiconductor particles are used to produce semiconductor elements. By the practice of the method of the present invention, it is possible to produce semiconductor elements of excellent characteristics in a simpler and easier manner as compared with that of conventionally known methods.

The production process for single crystals practiced widely heretofore, briefly described, has comprised: forming semiconductors of a purity of the order of 4 to 5 nines (99.99% to 99.999%) by a chemical reaction process such as the reduction with hydrogen of germanium obtained in the form of $GeO_2$ or the reduction with zinc vapor of silicon obtained in the form of $SiCl_4$ after purification by distillation; purifying these semiconductors to a high degree of purity of 7 to 9 or more nines (99.99999 to 99.9999999%) by a purification process such as, for example, the process called the zone-purification process or the process called the evaporation process; and obtaining monocrystalline semiconductors by further subjecting these high-purity semiconductors to a single-crystal production process called the upwardly withdrawing process or crystal-pulling process.

In the production of semiconductor elements which have the function of junctions from the above-mentioned monocrystalline semiconductors, some of the commonly practiced processes have been: the zone-leveling process for introducing the necessary quantities of impurities; the method of utilizing the crystal growth process depending on the upward withdrawal process and varying the upward withdrawing speed, or successively adding impurities, for producing a P-N junction; the alloying process for causing impurities to alloy into the surface of the semiconductors; and the method utilizing electrolysis for obtaining an element of surface barrier type.

In view of the fact that, among the known production processes mentioned above, the purification process step and the process step of upwardly withdrawing a single crystal are particularly important in their influence on the determination of the performance of the semiconductor elements as finished products, these process steps are extremely difficult and successful production is possible only with skilled operation in addition to rigid heat control and process control. Accordingly, improvement of these process steps has been widely desired.

It is an essential object of the present invention, therefore, to provide a method of producing monocrystalline semiconductors by a simple process, wherein the above-mentioned, known process steps of purification and upward withdrawal of a single crystal are totally or partly eliminated by the utilization of electric spark discharge.

It is another object of the invention to provide a method of producing semiconductor elements which have the function of junctions through the use of monocrystalline semiconductor particles and through the utilization of electric spark discharge.

It is yet another object of the invention to provide a method of collecting, in a simple manner, fine particles of monocrystalline semiconductors obtained through the utilization of electric spark discharge.

To facilitate a clearer understanding of the novelty of the first aspect of the present invention, that is, the production of monocrystalline semiconductor particles, the development of this aspect from a known technique of machining objects through the utilization of electric spark discharge is reviewed below.

The machining of a workpiece in the configuration of the machining electrode through the utilization of electric spark discharge within a liquid of electric insulative character is known. In this machining method, the machining electrode and the workpiece are disposed in mutually confronting positions with a minute gap therebetween, and an electric voltage is impressed across this gap within a medium of a dielectric liquid to generate a spark discharge, whereby the surface of the workpiece is caused to melt and scatter into the said liquid by the large quantity of heat and the impact pressure generated by the said electric spark discharge and to be sculptured in the configuration of the machining electrode. It is also known that, during this machining process, the portion of the workpiece which is machined away is transformed into fine particles or chips which progressively accumulate in the dielectric liquid.

It is known further that these "machining chips" which thus accumulate in the dielectric liquid are formed by the tearing off, melting, and discharging into the liquid of portions of the workpiece and the machining electrode, due to the large quantity of heat and impact pressure generated in the proximity of the electric-spark-discharge gap, and by the cooling of said "chips" in the liquid, and that, while the said "chips" are of various sizes, almost all are of substantially spherical shape.

Using the same process as the known electric-spark-discharge machining process described above, I placed semiconductors as mutually opposed electrodes in a dielectric liquid, intentionally produced fine particles of the semiconductors, and studied by X-ray diffraction the structure and composition of the said fine particles of the semiconductors obtained. As a result, the following points became clear:

(1) The size of the fine particles is, in almost all cases, determined by the magnitude of the electric energy which generates the electric spark discharge.

(2) When the size of the fine particles is small, the particles are spherical, but as the grain size increases, the said particles tend to assume forms of hollow spheres. Then, when the grain size is large, a channel leading from a portion of the outer surface of the hollow sphere to the interior thereof is formed.

(3) The compositional purity of the fine particles, partly or entirely, is higher than that of the semiconductor used as an electrode, and the surface resistance of the fine particles is higher than that of the semiconductor used as an electrode.

(4) Comparison of the surface resistance of the outer surface and the surface resistance of the inner surface of a particle which has been formed as a hollow sphere revealed that the surface resistance of the outer surface is higher than that of the inner surface.

(5) From the results of analysis of the composition of the particles by the X-ray diffraction method, it was confirmed that the direction of the crystal lattice in each particle is aligned uniformly, and that the structure is monocrystalline.

As for the reasons for the above-described phenomena, the details of the causes are not yet clear, but the following description of the formation of the particles will facilitate understanding of the essence and significance of this aspect of the invention.

First, the semiconductors which are used as electrodes are melted by the large quantity of heat generated by the electric discharge between the electrodes, and, at the same time, the melted portions of the said electrodes are scattered into the liquid by the high pressure developed about the electric discharge point as a center. In this case, the quantity of the electrode semiconductors scattered into the liquid by each electric discharge is determined by the energy of that one electric discharge. One portion of the impurities of low melting point is vaporized during the melting and scattering into the dielectric liquid and is released outside the liquid. The melted semiconductors are caused by surface tension to assume spherical shapes within the dielectric liquid, by which they are cooled, starting from their outer surfaces. During this cooling, the cooling rate is related also to the temperature of the dielectric liquid, but since the liquid itself is heated by the electric discharge, the said cooling rate is substantially lower than that ordinarily assured.

The molten semiconductor is thus cooled gradually, beginning at its outer surface, during which time a nucleus of an extremely fine crystal of the semiconductor existing on the outer surface becomes a seed, and the molten semiconductor existing in the proximity of the outer surface aligns the direction of the crystal lattice as this semiconductor is being cooled in the direction of the seed. At the same time, the impurity elements contained within the molten semiconductor are driven, because of the segregation effect, to the molten portion which is still in the liquid phase, and the concentration of impurities within the semiconductor crystal which is in the solid phase in the proximity of the outer surface is reduced. Finally, a tendency of the impurities to collect in the central part of the spherical particle is indicated, and, in conformity with the reduction of geometric volume accompanying cooling, a cavity is created within the particle, a layer of high impurity concentration being formed in the proximity of this cavity. As the size of the particles and the size of their cavities become larger, a state of vacuum is created in the cavities, and, during the progress of cooling, a weak portion of the outer surface of the sphere is drawn into the interior to form a channel.

By using fine particles of monocrystalline semiconductors formed through the utilization of an electric spark-discharge process as described above, it is possible to produce semiconductors by further forming a fusion-welded layer of high impurity concentration of a unit quantity of a donor or an acceptor impurity on the outer surfaces of the said fine particles by the alloy process depending on heat treatment, by the electrolytic process depending on electrolysis, or by creating electric spark discharge between the said fine particles and impurity alloys.

The details of the invention will be more clearly apparent by reference to the following detailed description of a specific embodiment of the method of producing particles of monocrystalline semiconductors according to the invention, as well as a method of gathering the fine particles and a method of producing junction elements through electric spark discharge according to the invention, when taken in connection with the accompanying drawing in which the same and equivalent parts are designated by the same reference numerals or letters, and in which:

FIG. 4 is a diagram showing an apparatus, which, as it produces fine particles of monocrystalline semiconductors in accordance with the invention, continuously collects the particles so formed;

FIG. 5 is a diagram illustrating a method of fusion-welding an impurity element by electric spark discharge on the outer surface of a fine particle of a monocrystalline semiconductor formed by the method of the invention and, thereby, producing a two-electrode junction-type element;

FIG. 6 is a schematic diagram illustrating a method of producing a three-electrode junction-type element in a manner similar to that illustrated in FIG. 5;

FIG. 7 is a diagram, partly in section, showing a portion of an apparatus for welding electrodes onto fine particles of monocrystalline semiconductors in the directions of the crystal lattices;

FIG. 8 is a diagram illustrating a method of welding on an electrode and, simultaneously, fusion-welding on a unit quantity of impurity element;

FIG. 9 is a diagram illustrating the fusion welding of a P-type semiconductor particle and an N-type semiconductor particle to produce a P-N junction element.

FIG. 10 is an enlarged view, in section, showing a fine particle of a monocrystalline semi-conductor formed by the method of the present invention;

FIG. 11 is enlarged views, in section, showing a junction element;

FIG. 12 is enlarged views, in section, showing another junction element; and

FIG. 13 is enlarged views, in section, illustrating the production of a semiconductor element of the required characteristics by cutting out a portion of suitable impurity concentration from a particle of a monocrystalline semiconductor formed by the method of the present invention.

Figure 1:
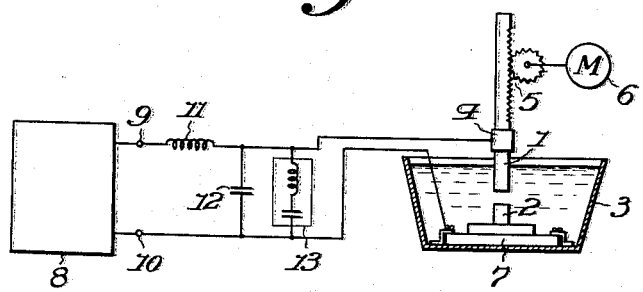
FIG. 1 is a schematic illustration used for explaining the principle of an apparatus for producing fine particles of monocrystalline semiconductors by creating an electric spark discharge with semiconductors as electrodes.

As shown in the diagram of FIG. 1, two semiconductors 1 and 2 are disposed in confronting positions, as electrodes, with a minute gap therebetween in a working liquid which is contained in an electric-discharge vessel 3. The elements 1 and 2 are semiconductors which have been obtained by a chemical reaction process; for example, they are single-element semiconductors having a suitable degree of purity. The electrode 1 is held firmly by an electrode-holding chuck 4 which is fixed to a rack-and-pinion device 5. The pinion of this device 5 is driven by a driving motor 6 to lower the rack, chuck 4, and electrode 1, with the progress of the process, in such a manner as to maintain a constant discharge gap between the electrodes 1 and 2. The electrode 2 is fixed on a work base 7 installed within the discharge vessel 3 and is positioned to be directly below and in alignment with the electrode 1. The two electrodes 1 and 2 are supplied with electric discharge power by a power supply system comprising a direct-current source 8 of operating power a stabilizing impedance 11, and a discharge capacitor 12. As shown in FIG. 1, terminals 9 and 10 of the power source 8 are connected to the capacitor 12 by way of the impedance 11, and the two terminals of the capacitor 12 are connected by lead conductors to their respective electrodes 1 and 2 made of semiconductor material.

If, in an apparatus arranged as described above, the discharge gap between the electrodes 1 and 2 is decreased, the electric charge stored in the capacitor 12 will be discharged through the discharge gap therebetween. Portions of the electrode materials will be torn off by the impact pressure developed by this discharge, being simultaneously melted by the large quantity of heat generated during the electric discharge, and will be scattered in the working liquid in the form of particles. The stabilizing impedance 11 suppresses any abrupt rise in the terminal voltage of the discharge capacitor 12, which has been temporarily lowered by the electric discharge, so as to prevent the spark generated in the gap between the electrodes 1 and 2 from being transformed into an arc discharge. Accordingly, the electric spark discharge which has once been released is stoped by the decrease in the terminal voltage of the discharge capacitor 12 and by the cleaning of the discharge gap by the working liquid. Subsequently, the discharge system waits until the terminal voltage of the discharge capacitor 12 has risen again, then discharges again to repeat the process of melting and scattering portions of the electrodes 1 and 2 within the liquid.

As this electric spark discharge is repeated, the semiconductor metals used as the electrode materials are caused to take the form of fine particles and are successively ejected into the working liquid. Accordingly, since the electrodes are each consumed with the progress of the process, the electrode 1 is designed to be fed gradually downward by the rack-and-pinion device 5 in order to maintain the discharge gap at a constant value and to make the electric discharge energy per cycle constant.

In FIG. 1, capacitor 12 represents a circuit element conventionally used as the power source for creating electric spark discharge, but, simultaneously, a plurality of inductance-capacitance, series-resonance circuits as indicated at 13, with staggered resonance frequency, may be placed in parallel in the circuit. If this is done, the energy developed by a single discharge will not become a single pulse but will take a form of superposed high-frequency pulses, and of continuous discharge becomes possible because the risk of fusion between the electrodes 1 and 2 is eliminated. Accordingly the above-mentioned expedient is effective in this respect and, moreover, increases the processing rate per unit time.

Furthermore, in place of a source of operating power using the stored energy of a discharge capacitor 12, a pulse-generating apparatus using a saturable reactor, a pulse-generating circuit using an electronic tube, or a generator of pulses may be used as the electric power source. The selection of the most suitable power source must be made with consideration of the fact that the size of the particles produced is determined by the magnitude of energy of the electric spark discharge.

For the working liquid, any liquid having an insulating property is adequate for the purpose of accomplishing electric spark discharge. In the development of the present invention, I used transformer oil or kerosene.

In one instance of use of kerosene, when the spark-discharge process by means of the apparatus as described above was carried out with germanium having a surface resistance of the order of 2 ohms per centimeter used as the semiconductor for the electrodes, with a discharge capacitor of 0.1 microfarad capacitance, and under the conditions of 80-volt average voltages between the electrodes and 3-ampere average operating current, spherical particles of average diameter of 50 microns were obtained from within the working liquid. The surface resistance of these spherical particles was 20 ohms per centimeter, and examination by means of an analyzer depending on X-ray diffraction revealed that these particles were of monocrystalline structure. I have been able to establish, furthermore, that particles formed under similar conditions with silicon as the electrode material also have monocrystalline structure, and that some other substances (e.g. metals) have the same tendency.

The following observations are of interest and helpful for an understanding of the invention. The particles which have been melted and projected into the working liquid by the electric discharge are heated to an extremely high temperature, and impurities with low melting points are vaporized and ejected out of the working liquid. The particles, as they assume spherical shapes due to surface tension, are projected through the working liquid at high velocities of the order of 150 to 500 meters per second and are believed to be cooled gradually by the working liquid, which has been heated by the electric discharge, at a rate which is much slower than that normally surmised as has been pointed out above. This slow cooling progresses gradually from the outer surface of the spherical particles towards their interior. As a result, the impurity element contained within the each particle travel toward the interior because of a segregation effect, leaving a layer of high impurity concentration in the core of the particle and, at the same time, creating the aforedescribed cavity in its interior. It is believed that, as the cooling due to the working liquid progresses inward from the outer surface of each particle, the liquid phase of the particle is transformed into the solid phase as the directions of the crystal lattice are gradually aligned with the semiconductor crystal nucleus in the proximity of the particle's outer surface as a seed.

From examination of particles obtained by the method of transforming semiconductor metals into particles by utilizing such an electric spark-discharge process as indicated in FIG. 1, the following facts, which are definite advantages of the present method, have been determined.

(1) A particle created by this method can be made to have an impurity concentration which is substantially reduced in comparison with that of the semiconductor used as the electrode material. Accordingly, in the production of such particles in finely comminuted form, it is possible to omit a part or all of the conventional purification process for semiconductor metals.

(2) A particle created by this method has a uniformly increasing impurity concentration from its outer surface to its interior. Accordingly, it is possible to produce a semiconductor element of any desired characteristic by cutting out from the particle a layer of the proper impurity concentration. The magnitude of the impurity concentration is correlated with the impurity concentration of the semiconductor used as the electrode material. For example, if a P-type semiconductor metal is used for the electrodes, the particles will also be P-type semiconductors, and their impurity concentration can be selected to be less than that of the electrode material by cutting out selected layers.

(3) As mentioned before, the impurity concentration of a particle created by this method can be reduced in comparison with that of the semiconductor used for the electrodes, but since its proportion of impurities is never varied, the electrode material employed need not be limited to a single-element semiconductor; thus by using an intermetallic compound semiconductor, it is possible to produce monocrystalline particles of an intermetallic compound semiconductor.

(4) Since the product created by this method has a monocrystalline structure and is, itself, a fine particle, it is possible to omit the conventional process of upwardly withdrawing a single crystal of a semiconductor metal from a solution and subsequently cutting out a fine particle therefrom, which has heretofore been necessary in the production of a semiconductor element, since the fine particle obtained by my method itself of microcrystalline structure suitable for use as a semiconductor element.

(5) Since particles created by this method can be made in any desired size by varying the magnitude of the electric discharge energy in the production step, it is possible to produce simply and in great quantities required particles of monocrystalline semiconductors (diameters of 1 millimeter or less).

Figure 2:
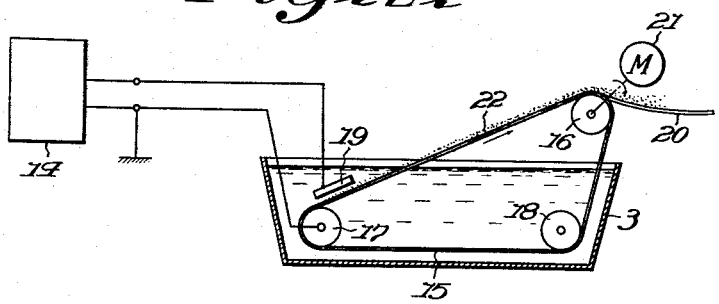
FIG. 2 is a diagram illustrating a method according to the invention of collecting the fine particles of monocrystalline semiconductors which have been scattered in a dielectric liquid and cooled.

FIG. 2 illustrates one method and means embodying another aspect of the invention, that is, of collecting from the working liquid fine particles of a monocrystalline semiconductor previously formed therein by spark-discharge detachment and cooling as described in connection with FIG. 1. A driving roller 16 and rollers 17 and 18 for supporting a conveying belt 15 are installed in an electric-discharge vessel 3 filled with a working liquid which contains the fine particles, the rollers 17 and 18 being submerged in the working liquid whereas the driving roller 16 is disposed so as to be outside and above the working liquid. The belt 15 riding on the three rollers is made of a thin, electrically conductive material. An electrode 19 is so disposed as to face the belt 15 with a minute gap therebetween within the working liquid. During operation a high voltage is impressed on the electrode 19 and roller 17 by a high-voltage, direct-current power source 14.

An apparatus arranged as described above has the following mode of operation in collecting the particles. The driving roller 16 is driven by a motor 21 to pull the belt 15 in the direction of the arrow shown. Accordingly, the fine semiconductor particles 22 contained within the working liquid are gathered between the electrode 19 and the belt 15 by the high-voltage, direct-current electric field generated therebetween and automatically ride on the belt 15, thereby being conveyed out of the working liquid and delivered to a particle collector 20. In FIG. 2, the electrode 19 is shown as being fixed, but, of course, it is possible to let this electrode rotate and also move linearly so as to collect the particles which have been gathered on the side of the electrode 19.

I have found that, with a gap of 1 centimeter between the electrode 19 and the belt 15 and an impressed voltage of 1,200 volts, germanium particles adhered to both electrodes, while aluminum particles adhered to the electrode of negative potential.

Another embodiment of the means for collecting the fine particles from the working liquid containing same is described below in connection with FIG. 3. In an electric-discharge vessel 3 filled with a working liquid, flat-plate electrodes 23 and 24 are immersed in parallel juxtaposition with a sheet of filter paper 25 disposed therebetween. During operation a high direct-current voltage is impressed on the electrodes 23 and 24 by the aforedescribed high-voltage, direct-current power source 14. Accordingly, an electric-field is created by the positive and negative electrodes 23 and 24, whereby the fine, monocrystalline semiconductor particles 22 suspended in the working liquid are attracted to the electrodes but are blocked by the intervening sheet of filter paper 25 onto which these particles adhere. After the lapse of a certain time, the filter paper 25 is taken out of the liquid and dried, and the particles adhering thereon are recovered.

Figure 3:
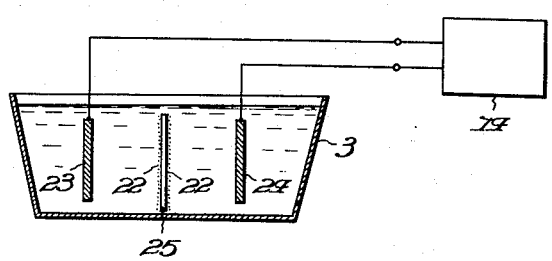
FIG. 3 is a diagram illustrating another method according to the invention of collecting the fine particles of monocrystalline semiconductors.

While only one sheet is indicated in FIG. 3 as the filter paper 25, it is to be understood that this is only a diagramatic representation of the method of collection. In actual practice, it has been found that the use of a plurality of sheets of filter paper, particularly when these sheets are disposed so as to encompass the positive and negative electrodes 23 and 24, results in effective collection of the semiconductor particles.

FIG. 4(a) diagrammatically illustrates an apparatus for recovering, monocrystalline semiconductor particles as they are produced in a working liquid by the method of the present invention. The assembly 1–13 is similar to that of FIG. 1 and operating in the identical manner.

The apparatus illustrated in FIG. 4(a) is further provided with a partition 26, in the form of a hollow cylinder or square column, so disposed as to encompass the electrodes 1 and 2 within the working liquid. The partition has an outlet 27 for the working liquid connected by a pipe 28 to a shower nozzle or shower head 29, under which a filter 30 is disposed. The outlet of the filter 30 is connected to a tank 31, from which the working liquid is returned by a pump 32 by way of a pipe 33 to the discharge vessel 3 in a region outside the tubular partition 26.

Accordingly, during the operation of the apparatus described above, the fine particles produced by the electrodes 1 and 2 pass out of the outlet 27 of the partition 26 together with the working liquid, are led by the pipe 28 to the shower head 29, and are sprayed therefrom onto a grating 34, shown enlarged in FIG. 4(b), in the filter 30. The fine particles 22 suspended in the working liquid are caught on the grating 34 as indicated in FIG. 4(c) and are thereby separated from the liquid. The working liquid from which the particles have been separated is cleaned and is stored in the tank 31, from which it is recirculated by the pump 32 into the discharge vessel 3. The working liquid which has been returned to the interior of the discharge vessel 3 flows over the top of the partition 26 to the vicinity of the discharge gap and cools the fine particles produced by the electric discharge.

The fine particles 22 which are caught on the grating 34 installed in the filter 30 have spherical shapes as was described before. The grating 34 is readily replaceable so that by periodic replacements it is possible to produce the fine particles continuously.

In the case of each of the devices described in connection with FIGS. 2, 3, and 4, the extracted fine particles are classified by size and used for the purpose of producing semiconductor elements.

Specifically, the fine particles are grouped in accordance with the kind of semiconductor material used for the electrodes 1 and 2 into such classifications as single-metal semiconductor, P-type or N-type single-metal semiconductor, intermetallic compound semiconductor, and P-type or N-type intermetallic compound semiconductor, all useful for the purpose of producing semiconductor elements.

Yet another aspect of the present invention, that is, a method of producing semiconductor elements which function as junctions through the use of monocrystalline semiconductor particles and through the utilization of electric spark discharge, may be exemplified by the spark-discharge production of diode elements, as indicated in FIG. 5, from monocrystalline semiconductor particles whose impurity concentration has been reduced by the aforedescribed spark-discharge process. A monocrystalline semiconductor particle 22 obtained by electric spark discharge, such as described previously, is mounted on a base metal 35, and with appropriate consideration of the direction of the crystal lattice of the particle 22, an electric spark discharge is created between the base metal 35 and an electrode 36 in an inert atmosphere. On the extreme end of the electrode 36, which is to be used later as a terminal, a unit quantity of impurity element 37 is made to adhere beforehand, and the impurity element is caused to melt and interfuse on the semiconductor particle 22.

By the practice of this method in a case where, for example, the semiconductor particle 22 is an N-type semiconductor and indium is used as the impurity element 37, the indium will be diffused on the surface of the N-type semiconductor 22 to form a P–N junction, that is, it will be possible to produce a diode constituting a so-called alloy-type junction.

Heretofore, alloy-type junctions have been produced by heat treatment, the heat control of which has been difficult. In the practice of the present invention, however, wherein the use is made of electric spark discharge with utilization of the heat generated thereby, it is possible to fusion-weld an impurity element 37 onto a particle 22 in a simple manner.

A further method practiced heretofore has been that of the surface-barrier type for producing junctions through electrolysis. The method of the present invention utilizing electric spark discharge, however, is comparable to the electrolytic method in simplicity of operation and is capable of producing junctions easily.

The method of the present invention can be applied further to the production of three-terminal semiconductor elements through a similar utilization of electric spark discharge as is indicated in FIG. 6. In exactly the same manner as that illustrated in FIG. 5, a monocrystalline semiconductor particle 22 obtained by the first two steps of the invention described hereinabove is mounted on a base metal 35, and electric spark discharge is created between the particle 22 and an electrode 36, which is to be used subsequently as a terminal, whereby a unit quantity of an impurity element made to adhere to the electrode 36 is melted and fusion-welded onto the particle 22. Thereupon, in order to produce a three-electrode element, in the vicinity of the fusion-welded position of the terminal member 36 there is fusion-welded to particle 22 an impurity element 37' an electrode 36', the impurity element 37' being an acceptor if the impurity element 37 is a donor, and vice versa.

Since in a three-terminal semiconductor element, in general, the electrons or the positive holes which pass through the collector from the emitter determine its performance, it has been found desirable to make the intermediate layer between the emitter and collector electrodes as thin as possible by etching the weld positions on the semiconductor particle 22 prior to the fusion-welding of the impurity elements 37 and 37'.

FIG. 7 indicates yet another technique of the invention for welding terminals to several monocrystalline semiconductor particles. The principal part of the apparatus is a base plate 39 made of carbon or some other material and provided with several pit-like depressions 40, each of which has at substantially the center of its bottom a bore 41. The welding procedure comprises placing monocrystalline semiconductor particles 22 obtained from the aforedescribed spark-discharge process in the depressions 40, inserting terminal members 36 upwardly through the bores 41 to the particles 22, and fusion-welding together the said particles 22 and the terminal members 36 by a heat treatment process or by creating electric spark discharge as was described in connection with FIG. 5. Furthermore, when a suitable impurity element is to be introduced into the particle 22, a unit quantity of the impurity element 37 which has been made to adhere to the extreme end of the terminal member 36 is brought into contact with the said particle 22 as is indicated in FIG. 8. It will be readily understood that this procedure must be performed with the parts in an inert atmosphere so as to prevent the introduction of undesirable impurities.

The techniques of the present invention include a method, as indicated in FIG. 9, of combining single-element or compound semiconductors of P type and N type prepared by the steps described in connection with FIGS. 7 and 8, to produce a P-N junction element. In the practice of this method, a monocrystalline semiconductor particle 22 of P type, to which a terminal 36 is welded, and a monocrystalline semiconductor particle 22' of N type, to which a terminal 36' is welded, are combined by the alloy method based on heat treatment or by fusion-welding by the electric spark-discharge method described in connection with FIG. 5 to produce a P-N junction.

It has been found that in the described process for producing semiconductor elements, particularly in the case of creating an electric spark discharge to fusion-weld terminals as was described in connection with FIG. 5, it is possible to produce a P-N junction element by using carbon for the particle 22. In view of the known fact that carbon is a substance which has characteristics of either P type or N type, I juxtaposed the electrode 36 with a P-type carbon particle and created therebetween a spark discharge, with the result that the portion of this P-type carbon particle in the vicinity of the discharge point was heated to a high temperature, and only this portion in the vicinity of the discharge point was transformed into an N-type region. It was also determined that, when the electrode was positioned, conversely, to confront an N-type carbon particle, and a spark discharge was created therebetween, the portion of the N-type carbon particle in the vicinity of the discharge point was transformed into a P-type region.

Thus, it was established that a semiconductor element produced in this manner with carbon as its base body possesses the characteristics of a P-N junction between the basic P-type or N-type portion of the carbon body and the N-type or P-type region created by transformation at the discharge point, such a semiconductor element being capable of functioning as a diode.

I have found, furthermore, that when an N-type semiconductor particle obtained by the electric spark-discharge process is used as the particle 22 which is inserted in the depression 40 of the base plate 39 as indicated in FIG. 7, heated to a temperature of the order of 700° C. and heat treated, and then cooled gradually at a cooling rate which does not cause disarraying of the crystalline structure of the particle, the semiconductor particle which originally was of N-type is transformed into a P-type semiconductor.

Explanation of the reason for this transformation from an N type to a P type must await future research. Moreover, the results of my experiments reveal that a reverse transformation from a P-type semiconductor particle to one of N type does not occur, the reason for this being unknown at present.

FIG. 10 is an enlarged diagrammatic view of a particle obtained by using semiconductors such as those indicated in FIG. 1 as electrodes and by creating an electric spark discharge therebetween. As the size of the particle increases, a cavity 42 develops the body of the particle. Then, as the particle grows still larger, a channel 43 is created between the cavity 42 and the exterior surface. Furthermore, the impurity concentration within the particle 22 progressively increases from the exterior toward the interior, becoming a maximum particularly in the proximity of the wall surface of the cavity 42. The reasons for and the mechanism of the formation of such particles have been already described. The dotted lines shown in FIG. 10 indicate the progressive increase of the impurity concentration from the outer surface toward the interior.

FIG. 11 is an enlarged diagrammatic view illustrating the production of a junction element by using a large monocrystalline semiconductor particle, FIG. 11(a) indicating a monocrystalline semiconductor particle thus obtained, and FIG. 11(b) depicting the process step of producing a P-N unction element by fusion-welding impurity elements of P type 37 and N type 37' according to the direction of the crystal of the said particle or, in the case where the terminals themselves possess either P-type characteristic or N-type characteristic, by fusion-welding the impurity element 37 to the outer surface of the particle 22 and, on the other hand, simply causing the terminal member 36' to adhere to the particle 22 without fusion-welding the impurity element 37' thereon.

FIG. 12, similarly to FIG. 11, is an enlarged diagrammatic view indicating the production of a junction element by using a large monocrystalline semiconductor particle, FIG. 12(a) illustrating a monocrystalline semiconductor particle obtained by the electric spark-discharge, and FIG. 12(b) illustrating the process step of producing a P-N junction element by fusion-welding onto the outer surface of the particle 22 two terminals 36, 36' and, if necessary, impurity elements 37, 37'.

In the case of the junction element illustrated in FIG. 11(b), since one terminal is connected to the outer surface of the particle 22 and the other terminal to the inner wall of the cavity thereof, the conductivity type (i.e. P or N), of the contact portion 37' of the terminal member 36' which is attached to the cavity wall of the particle is determined by its relation to the characteristic impurity of the particle itself; and the impurity element 37 to be attached to the terminal member 36 must be selected with correct consideration of the same characteristic impurity. Thus, if the element illustrated in FIG. 11(b) contains a characteristic impurity endowing it with conductivity of P type or of N type, it suffices to attach the terminal member 36' to the cavity of the particle, there being no necessity of especially introducing an impurity element 37'.

In the case of the junction element illustrated in FIG. 12(b), since two terminals are both attached to the outer surface of the particle 22, these terminals both utilize portions of low impurity concentration of the particle. Accordingly, when the semiconductor element is thus made, its performance is superior to that of the junction element illustrated in FIG. 11(b).

FIG. 13 illustrates how, by the use of a large particle obtained through the electric spark-discharge process, an element which has the required impurity concentration is produced. From a large particle 22 as illustrated in FIG. 13(a), a portion 22' of the desired impurity concentration is cut out by some method such as etching, and lead terminals 36 and 36' are connected thereto to make an element as illustrated in FIG. 13(b). By this method, it is possible to produce easily, for example, an element having a so-called tunnel effect by using a portion of high impurity concentration from a large particle. The portion indicated by dotted lines in FIG. 13(b) represents the contour of the original particle prior to the removal, e.g. by etching, of the excess material. It will be readily understood that, in the case of etching, the layer of the desired impurity concentration can be cut out by two steps consisting of ecthing from the outer peripheral surface of the particle and etching from the interior wall of the cavity thereof.

The most significant aspect of the present invention resides in the fact that the fine semiconductor particles obtained by the electric spark discharge process are not cooled suddenly in the working liquid as is commonly surmised but are cooled gradually, so that the purity is increased locally because of the segregation effect and, at the same time, a fine particle having a monocrystalline structure is obtainable. This fact may be called a revolutionary development relating to the production of semiconductor elements because it foreshadows eventual abandonment of the method of single-crystal withdrawal which has been considered extremely difficult and can be successfully accomplished only under the most rigid heat control and process control and with highly skilled operators.

The term "semiconductor" as used in the disclosure of this invention is used to denote, collectively, a single-element or compound, i.e. intermetallic semiconductor in general or of distinctive P-type or N-type conductivity compound, and P-type or N-type intermetallic compound.

While the invention has been described with particular reference to specific procedures and embodiments, it is to be understood that the method of the invention can be performed in many other ways and that the details stated herein are not to be construed as limitative of the invention, except insofar as is consistent with the scope of the following claims.

I claim:

1. A method of producing monocrystalline semiconductive particles comprising the steps of juxtaposing at least two electrodes including a first electrode of inorganic crystalline impurity semiconductive material containing at least one impurity element and selected from the group consisting of P-type and N-type semiconductors, and a second electrode spaced from said first electrode; surrounding at least the juxtaposed portions of said electrodes with a dielectric liquid; intermittently passing an electric current between said electrodes sufficient to produce a spark discharge between them of an intensity such that portions of said first electrode are eroded at the elevated pressure and temperature of said discharge, thereby dispersing monocrystalline particles of said semiconductive material in said liquid; and collecting said particles.

2. A method of producing monocrystalline semiconductive particles, comprising the steps of juxtaposing at least two electrodes including a first electrode of inorganic crystalline impurity semiconductive material containing at least one impurity element and selected from the group consisting of P-type and N-type semiconductors and a second electrode spaced from said first electrode; surrounding at least the juxtaposed portions of said electrodes with a dielectric liquid of, at most, limited conductivity; intermittently passing an electric current between said electrodes sufficient to produce a spark discharge between them of an intensity such that portions of said first electrode are eroded at the elevated pressure and temperature of said discharge while maintaining the gap between said electrodes substantially constant, thereby dispersing particles of said semiconductive material in said liquid; collecting said particles and incorporating at least one of said particles in an electric circuit.

3. A method of producing monocrystalline semiconductive particles of relatively high purity, comprising the steps of juxtaposing at least two electrodes including a first electrode of inorganic crystalline impurity semiconductive material containing at least one impurity element and selected from the group consisting of P-type and N-type semiconductors and a second electrode spaced from said first electrode; surrounding at least the juxtaposed portions of said electrodes with a dielectric liquid of, at most, limited conductivity; intermittently passing an electric current between said electrodes sufficient to produce a spark discharge between them of an intensity such that portions of said first electrode are eroded at the elevated pressure and temperature of said discharge thereby dispersing monocrystalline particles of said semiconductive material in said liquid while reducing the concentration of said impurity in said particles below that of said first electrode; and collecting said particles.

References Cited in the file of this patent

UNITED STATES PATENTS

| | | |
|---|---|---|
| 1,350,482 | Wells et al. | Aug. 24, 1920 |
| 2,527,636 | Holden | Oct. 3, 1950 |
| 2,771,194 | Baxter et al. | Sept. 14, 1953 |
| 2,785,280 | Eisler et al. | Mar. 12, 1957 |
| 2,801,907 | Scott | Aug. 6, 1957 |
| 2,813,064 | Clark | Nov. 12, 1957 |
| 2,855,334 | Lehovec | Oct. 7, 1958 |
| 2,883,544 | Robinson | Apr. 21, 1959 |
| 2,960,454 | Warner et al. | Nov. 15, 1960 |